(12) United States Patent
Nunn et al.

(10) Patent No.: US 9,203,824 B1
(45) Date of Patent: Dec. 1, 2015

(54) SYSTEM AND METHOD FOR AUTHENTICATING A COMPUTER SESSION ON A MOBILE DEVICE USING A TWO DIMENSIONAL BARCODE

(71) Applicant: Future Research Corporation, Huntsville, AL (US)

(72) Inventors: Jesse W. Nunn, Huntsville, AL (US); Carlos Mathews, Huntsville, AL (US)

(73) Assignee: Future Research Corporation, Huntsville, AL (US)

( * ) Notice: Subject to any disclaimer, the term of this patent is extended or adjusted under 35 U.S.C. 154(b) by 47 days.

(21) Appl. No.: 14/177,873

(22) Filed: Feb. 11, 2014

Related U.S. Application Data

(60) Provisional application No. 61/763,889, filed on Feb. 12, 2013.

(51) Int. Cl.
*H04L 29/06* (2006.01)
*H04L 29/08* (2006.01)
*G06F 21/30* (2013.01)
*G06F 21/31* (2013.01)
*G06F 21/36* (2013.01)

(52) U.S. Cl.
CPC ............... *H04L 63/08* (2013.01); *G06F 21/30* (2013.01); *G06F 21/31* (2013.01); *G06F 21/36* (2013.01); *H04L 67/148* (2013.01)

(58) Field of Classification Search
CPC ......... G06F 21/30; G06F 21/31; G06F 21/36; H04L 67/148; H04L 65/1083
See application file for complete search history.

(56) References Cited

U.S. PATENT DOCUMENTS

2014/0088983 A1* 3/2014 Neff .................................. 705/2

* cited by examiner

*Primary Examiner* — Samson Lemma
*Assistant Examiner* — Arya Golriz
(74) *Attorney, Agent, or Firm* — The Gache Law Firm, P.C.; Russell C. Gache

(57) ABSTRACT

A secure authentication method allowing a user to automatically switch between a web application running on a desktop computer and a mobile device is disclosed. The system includes a communications channel using a Quick Response or "QR" code to securely encode login credentials that may be captured by a mobile device for validation by a web application server. Once validated, a browser on the mobile device is redirected to a webpage displaying the last known workspace session in the web application, thereby allowing the user to resume their workplace session in an uninterrupted manner.

18 Claims, 4 Drawing Sheets

SYSTEM AND METHOD FOR AUTHENTICATING A COMPUTER SESSION ON A MOBILE DEVICE USING A TWO DIMENSIONAL BARCODE

This application claims the benefit of filing priority under 35 U.S.C. §119 and 37 C.F.R. §1.78 of the U.S. Provisional Application Ser. No. 61/763,889 filed Feb. 12, 2013, for a System and Method for Authenticating a Computer Session Using a Q.R. Code. All information disclosed in that prior pending provisional application is incorporated herein by reference

FIELD OF THE INVENTION

The present invention relates generally to computer security. In greater particularity, the present invention relates to computer access and user authentication. In even greater particularity, the present invention relates computer session authentication using visual indicia for mobile devices.

BACKGROUND OF THE INVENTION

A "quick response" code or "QR" code as it is referred to in the a brand name for a type of matrix barcode (or two-dimensional code) first designed for the automotive industry. Invented in Japan by the Toyota subsidiary Denso Wave in 1994 to track vehicles during the manufacturing process, the QR Code is one of the most popular types of two-dimensional barcodes. It was designed to allow its contents to be decoded or "scanned" at high speed.

QR codes are squares, with an equal number of rows and columns. There are a fixed set of QR code sizes: from 21 to 177 rows/columns, increasing in steps of four. Each configuration is called a version. The more rows/columns, the more data the code can store. An example of a QR code format with explanatory legends is presented in Table 1.

A familiar version of a barcode, commonly found on food packaging and some consumer items in large department stores, includes a linear set of varying line widths which are optimized to be scanned by a narrow beam of progressing light, typically at a check-out register. This type of barcode is a single or one-dimensional barcode an example of which may be found in Table 2. However, a QR code has the configuration of a 2-dimensional digital image optimized for capture and recordation by a semiconductor image sensor, which can then be digitally analyzed by a programmed processor. The QR code is arranged so that the processor will locate three distinctive squares at the corners of the image and a forth smaller square near a further corner, allowing the processor to normalize the QR code image from any presented size, orientation, and angle of viewing. The small dots in the QR image may then be converted into binary numbers and their validity checked with an error-correcting algorithm.

Currently, mobile phones and generally mobile devices are able to take an image of a QR code and direct a browser application on the mobile device to a selected website. The QR code encodes a website universal resource locator ("url") within the image and the camera on the mobile device captures an image of the code and transfers it to a decoding application. The decoding application is able to implement encoded instructions in the QR code to open a designated application, or a default application such as a web browser can be invoked in response to a decoded variable, such as an internet url.

Mobile devices are also becoming more and more sophisticated, and a majority of people today are using their mobile devices to do sophisticated work once only achievable on a desktop personal computer. In fact, not much can be accomplished on a desktop computer that cannot also be accomplished with a mobile device. Nevertheless, the desktop com-

TABLE 1

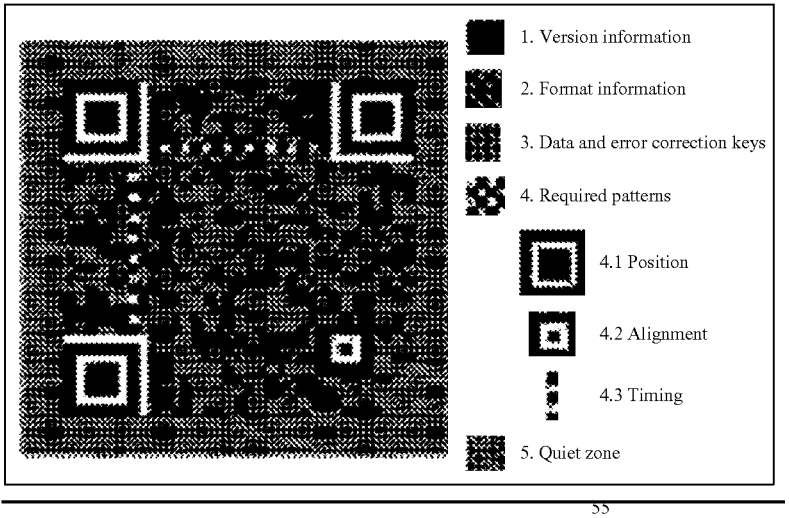

TABLE 2

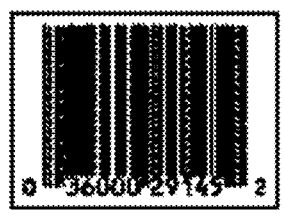

puter remains a fixture in typical corporate environments. However, people are more mobile than ever before and are expected to accomplish goals irrespective of their physical location and office presence.

At the same time, authors of desktop applications are migrating their desktop versions to mobile devices with either full or substantially the same desktop features. This parallel migration and simultaneous support of both desktop and mobile applications allows workers to continue utilizing an application on their mobile device even after leaving their desktop environment. The simultaneous migration has been facilitated by the use of web based applications. Web based applications are available 24/7 irrespective of the device accessing web based application.

However, the transfer over to a mobile application, having multiple windows and documents open in a particular application session is not seamless, and is generally an interruption to a work process. Documents must be exited and saved; session windows must be closed; and data consolidated. Even on web based applications, a login process is required to be able to access the documents and data previously accessed. Hence, the integration of desktop sessions to mobile sessions would benefit from a seamless access process for a mobile device that allows for a secure and automatic login procedure from an application running on a desktop platform to a mobile device.

SUMMARY OF THE INVENTION

The present invention records certain session variables and logon credentials of a user on a desktop computer accessing a web-based application. Upon request, the web-based application generates a QR code on the desktop display encoding the user's login credentials and other information. The user captures the QR code image with a mobile device and the device uses a QR code decoder to decode the information in the QR code image which opens a browser and attempts to login to the server previously accessed by the user from the desktop computer. If the credentials are found to be timely and valid, a session variable is created and the browser on the mobile device is directed to a webpage showing the same workplace previously utilized by the user on the desktop computer.

Other features and objects and advantages of the present invention will become apparent from a reading of the following description as well as a study of the appended drawings.

BRIEF DESCRIPTION OF THE DRAWINGS

A system incorporating the features of the invention is depicted in the attached drawings which form a portion of the disclosure and wherein.

DESCRIPTION OF THE PREFERRED EMBODIMENTS

Figure 1:
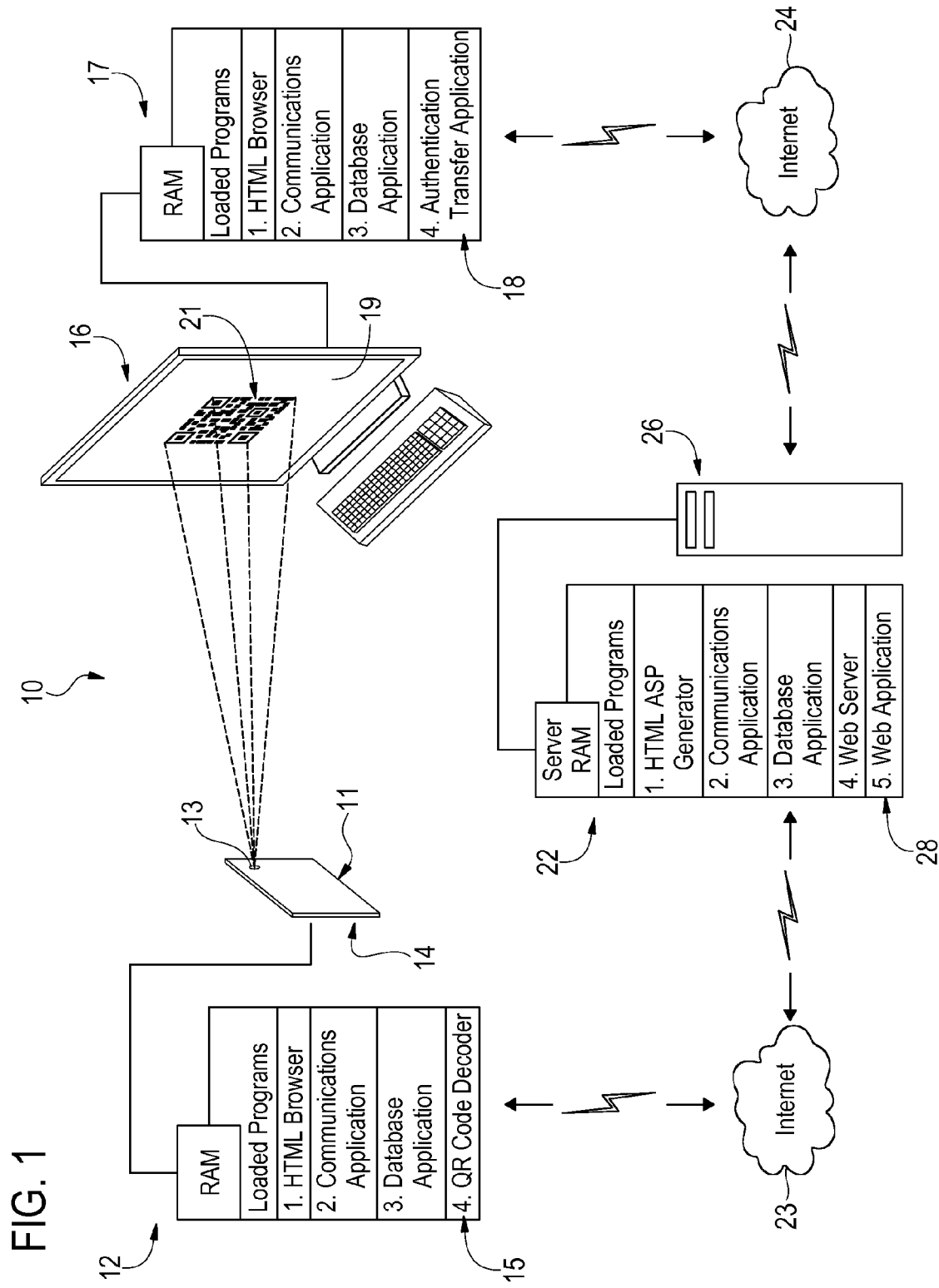
FIG. 1 is a diagram of the interaction between a mobile device and a desktop computer incorporating the invention.

Referring to the drawings for a better understanding of the function and structure of the invention, FIG. 1 shows a system 10 for transferring authenticated access from a desktop computer 16 to a mobile device 11. A nominal desktop computer 16 includes running in its random access memory ("RAM") 17 various operational computer programs to allow it to access a world wide web application server 26. The mobile device 11 also has various operational computer programs running in it's RAM 12 to allow it to run local applications and communicate with the server 26 via the Internet 23.

Server 26 has computer programs loaded into its RAM 22 various programs to allow it to communicate over the Internet (23,24) with the desktop computer 16 and the mobile device 11. Sever 26 has running on it a web application 28, such as for example an email application or word processing application, accessible by desktop computer 16. An authentication program 18 either running on computer 16 as shown, or running on server 26, creates and displays a QR code 21 on the display 19 of computer 16 for the purpose of authentication and access of the web application 28 by mobile device 11. Mobile device 11 includes a camera 13 or other type of optical receiver that has the ability to capture an image of a QR code 21 as shown on display 19. Mobile device 11 can be any type of device, such as for example a smart phone, a tablet computer, or a notebook computer. Device 11 also includes a QR code decoding application 15, as will be more fully discussed.

Figure 2:
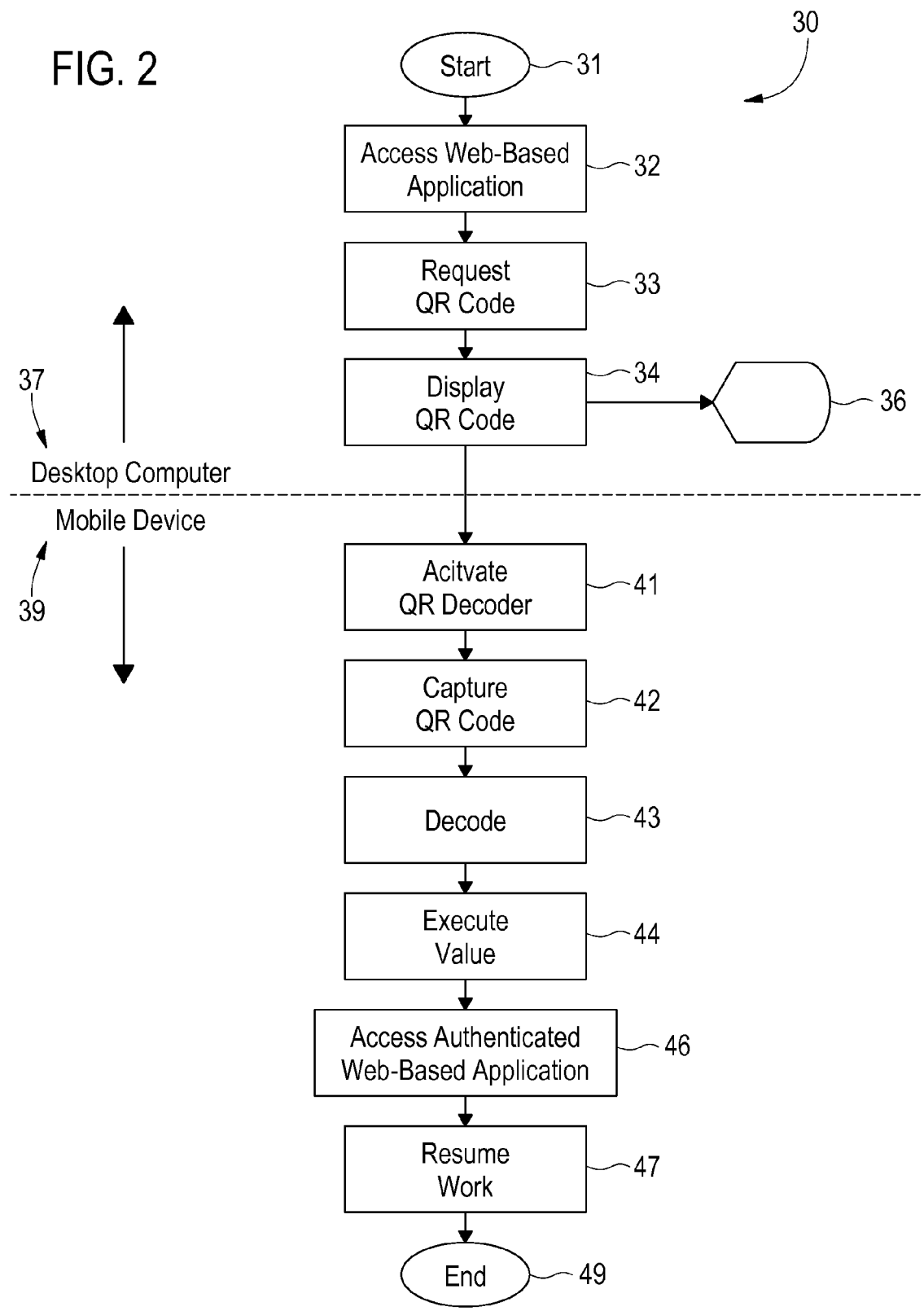
FIG. 2 is a flow diagram showing the authentication transfer process.

Referring to FIG. 2, a user on desktop computer 16 accesses a web-based application 32 on which the user may work for some time. Whatever credentials are required, such as a user identification ("ID") and password, are input into the application in order to access a workspace previously ascribed to the user. For example, the user may have settings in an email application that shows certain folders at login having a particular color window theme, and presenting certain folders or emails which have been previously viewed in the past. At some point, the user has a desire to transfer his current workspace to a mobile device and makes a request for a QR code in the application 28 to be created 33 and displayed 34 on the display screen of the desktop computer 36. The mobile device 11 activates a QR decoder application 41 and captures an image of the QR code displayed on the desktop computer. It then decodes the QR code 43 and executes the encoded values in the QR code 44. Executing the value 44 results in a browser application on the mobile device being launched and a website accessed from a url encoded in the QR code, and also presenting session credentials to the web-based application on the server 26 that also encoded the QR code 46. Work may then be resumed by the user 47 in the same workspace previously utilized on the desktop computer.

Figure 3:
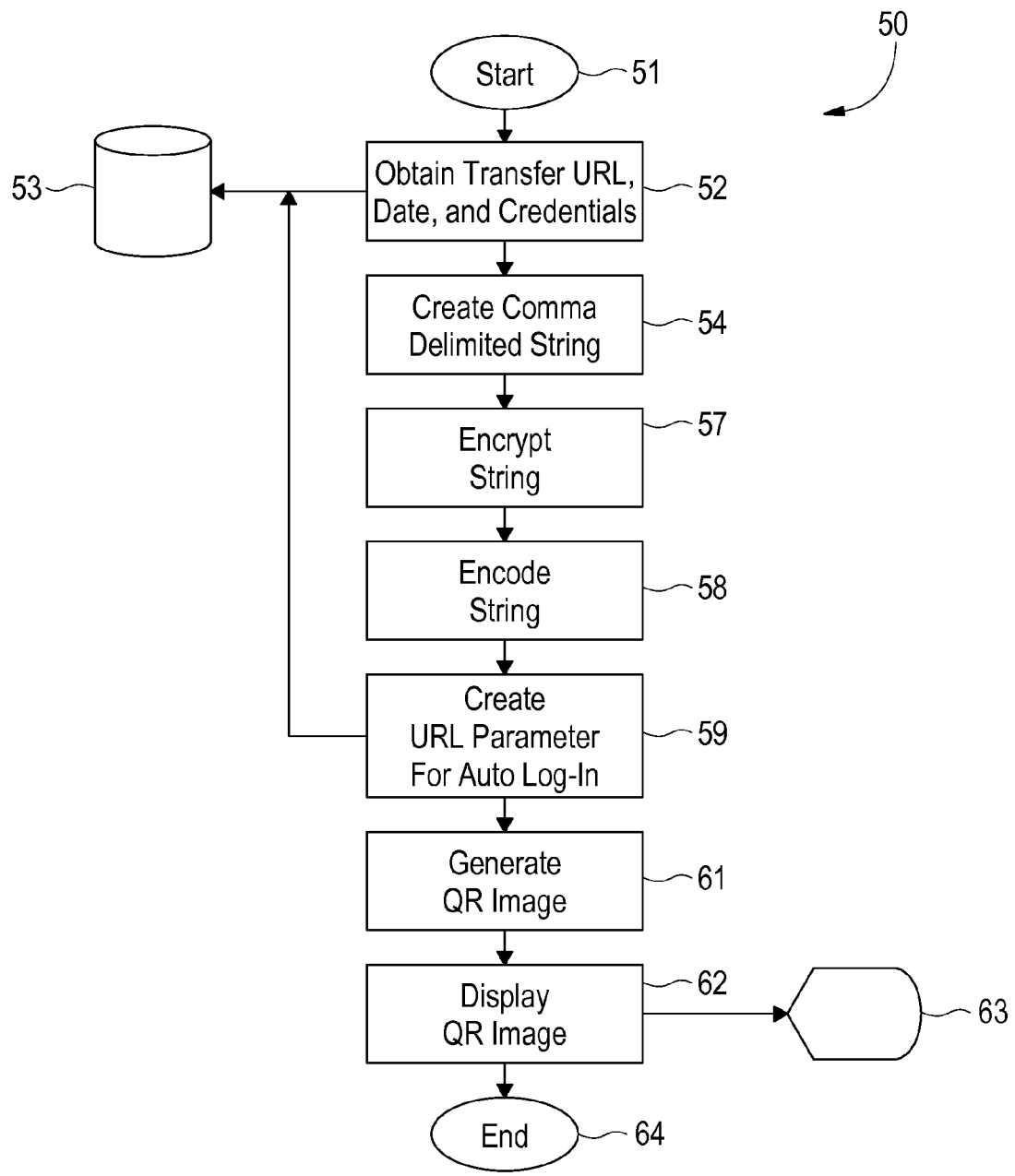
FIG. 3 is a flow diagram showing how a QR code is generated for display on a desktop computer; and, FIG. 4 is a flow diagram showing the receipt and decoding of the QR code on the mobile device.

FIG. 3 shows more detail of the process 50 to present a QR code on the desktop computer screen 19 via process portion 37 of overall process 30 in FIG. 2. Initially, application 28 obtains the workspace url for the web application 28, the time and date, and logon credentials for the user 52. A comma delimited string is then created 57 and that string encoded 58, and then a url parameter for an automatic login is created 59. That data is then encoded in a QR code image 61 and displayed 62/63.

In greater particularity, by using .NET system calls the current date may be obtained and temporarily stored, and the url of the webpage currently being displayed on the desktop recorded along with the current server name on which the web application is running. For example, the current url for the web application could be transit-db.future-research.com and the current local server could be:

http://localhost:8080/Flight_Request_List.aspx.

User information may be obtained as a session variable such as, for example a, user ID and password using a .NET C-user class function. For example, a user name of frc_flight with a password of Team_SALT. Once all relevant system and user specific information is gathered (e.g. url, password, user name, current time, date, current server name) the information is saved in an array 53 and concatenated into a string with the date in the format of mm/dd/yyyy. Using the above example data, an example of such a concatenation is shown in Table 3.

TABLE 3

"2/7/2013 7:21:24 AM,FRC_FLIGHT,Team_SALT,transit-db.future-research.com,http://localhost:8080/Flight_Request_List.aspx"

An example of programming code that will accomplish this task is shown in Table 4.

TABLE 4

```
 1.  private
     string Generate_Logon_Key( )
 2.  {
 3.
 4.     try
 5.     {
 6.         StringBuilder MyBuilder  = new StringBuilder ( );
 7.         CCrypto_Base MyCrypto    = new
            CCrypto_Base (DateTime.Today.ToShortDateString( ));
 8.         if (Session["User_Info"] != null)
 9.         {
10.             Uri MyURI           =
            HttpContext.Current.Request.Url;
11.             CUser MyUser        = (CUser)Session["User_Info"];
12.
13.             MyBuilder.Append(DateTime.Now.ToString( ));
14.             MyBuilder.Append(",");
15.             MyBuilder.Append(MyUser.UserID);
16.             MyBuilder.Append(",");
17.             MyBuilder.Append(MyUser.Password);
18.             MyBuilder.Append(",");
19.             MyBuilder.Append(MyUser.Server);
20.             MyBuilder.Append(",");
21.             MyBuilder.Append(MyURI.OriginalString);
22.         }
23.         string sTest = MyBuilder.ToString( );
24.         return MyCrypto.Encrypt(MyBuilder.ToString( ));
25.
26.     }
27.     catch
28.     {
29.         return string.Empty;
30.     }
31.
32.  }
```

For security purposes, the data string concatenation is then encrypted by using a salt of the current date with the salt date having a format of mm/dd/yyyy. The encrypted data string is percent encoded which maps a range of characters into 60 or so characters permitted for use in a url. A url (i.e. a "bookmark") is added to redirect the web browser to an auto authentication web page and stored in the array 53 for later comparison with data presented by a mobile device to the server 26 and for QR code generation. An example of an encrypted string using the data shown in Table 3 is shown in Table 5.

TABLE 5

LoU+dTW8gKKPYhsAFHd3XE62r8TCDuvOc41s82zIeV8Y2M
RtmlOAB6uS94uUJ8fuxUD4QdXrVV1i2zaO/q9IF/KtTbGV/uzd
OvNUaYQdI6Fel9BAqG3dsoZnOk0pQ2olovqQFux87TezHgEtIH
PGzFe3E9cuuE1t Using the encrypted data shown in Table 5, a QR code is created using standard library functions, known in the art, and that QR code image 21 displayed on desktop screen 19 as shown in FIG. 1. Upon display of the QR code image, a 60 second timer function is started to provide a security time window to authenticate the mobile device 11.

Figure 4:
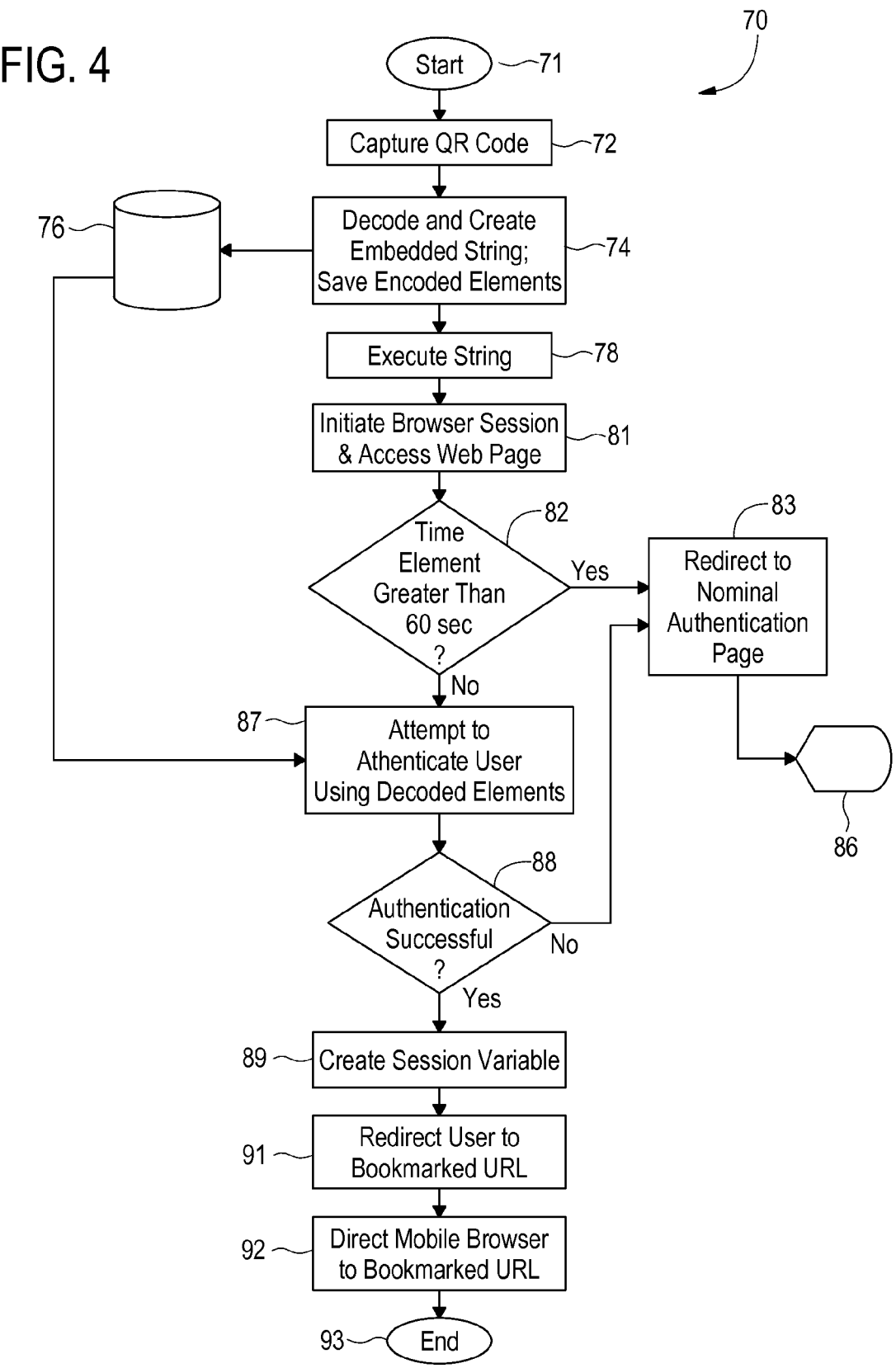

As shown in FIG. 4, a QR code capture application 15 (FIG. 1), as is known in the art, accesses an optical capture device such as a camera 13 (FIG. 1) and captures the QR code on the mobile device 72. The QR code is then decoded and the embedded string extracted so that the data may be mapped back to usable characters. All spaces are replaced with plus signs within the data string and the data decrypted using the current day as the salt and the date format again in mm/dd/yyyy 74. The common delimited string is then placed into an array and saved 76. The presented string is executed 78 with the url encoding causing the launching of a web browser application on the mobile device that attempts to access the decoded url 81. Data is passed to the web application 28 (FIG. 1) as part of the execution of the url command string encoded by the desktop and the encoded time element compared to the time element recorded by the web application when the QR code image was created 82. If less than 60 seconds has elapsed, the user information is submitted for authentication 87. If more than 60 seconds has elapsed, the web application redirects the browser to a nominal authentication page from which the user may attempt to manually login 83. Upon validation 88 of the user decoded credentials, a session variable is created and the browser is redirected to a bookmarked url 91 for immediate display of the prior desktop workspace session 92 on the screen of the mobile device 11. If authentication fails 88, the web application again redirects the browser to a nominal authentication page from which the user may attempt to manually login 83. Example computer programming that will achieve the decoding and web browser data presentation to server 26 is shown in Table 6.

TABLE 6

```
 1.  protected void imgBtnGo_Mobile_Click(object sender,
     ImageClickEventArgse)
 2.  {
 3.     try
 4.     {
 5.         Image imgGoMobile = (Image) FindControlRecursive(this,
         "imgQR"),
 6.         string sKey          = Generat_Logon_Key ( );
 7.         sKey                 = Url.EscapeDataString(skey);
 8.
 9.         string sURL          = string.Empty; ;
10.         Uri MyURI            = HttpContect.Current.Request.Url;
11.         String sAutoLogon    = string.Empty;
12.
13.         #if DEBUG
14.         sAutoLogon           = @"http://" + MyURI.Authority +
         "/auto_logon.aspx?Data=";
15.         sURL                 = @"http://" + MyURI.Authority +
         "/QR_gen.aspx?DATA=" + sAutoLogon + sKey;
16.         #else
17.         sAutoLogon           = @"http://" + MyURI.Authority +
         "/tho_web/auto_logon.aspx?Data=";
18.         sURL                 = @"http://" + MyURI.Authority +
         "/tho_web/QR_gen.aspx?DATA=" + sAutoLogon + sKey;
19.         #endif
20.
21.         imgGoMobile.ImageUrl = sURL;
22.     }
23.     catch (Exception ex)
24.     {
25.         if (this.Page.Title I = "Flight View" && this.Page.Title I =
         "Flight Timeline")
26.         {
27.             THO_Web.(System_Error MyError = new
         THO_Web.(System_Error(this.Page.Titla, ex);
28.         }
29.     }
30.  }
```

While I have shown my invention in one form, it will be obvious to those skilled in the art that it is not so limited but is susceptible of various changes and modifications without departing from the spirit thereof.

What is claimed is:

1. A method for transferring session authentication information from a desktop computer to a mobile device, comprising the steps of:

a. accumulating user authentication information on a desktop computer;

b. generating a QR code encoding said authentication information including, the steps of:
   i. creating a comma delimited character string including a universal resource locator, a date and time indicator, and a user ID and password;
   ii. encrypting said comma delimited string with a salt of the current date; and,
   iii. generating a QR image encoding said encrypted comma delimited string;
c. displaying said QR code as an image on a display associated with said desktop computer;
d. capturing said QR code image on a mobile computing device;
e. decoding said authentication information in said QR code image; and,
f. directing a browser program running on said mobile computing device to access an application program the location of which is encoded in said QR image and passing said authentication information to said application program for secure access therefor.

2. A method as recited in claim 1, wherein said step of decoding said authentication information comprises the steps of decoding the QR code image into a comma delimited string, decrypting said string with the current date as the salt, and saving said information into a memory array.

3. A method as recited in claim 2, wherein said step of directing a browser program comprises the steps of launching a browser application on said mobile device, accessing a website at the url location encoded in the QR code image, and presenting authentication information to a remote server upon accessing said website.

4. A method as recited in claim 3, further comprising the steps of:
   a. recording a session workspace identifier in an application displayed on said desktop computer;
   b. encoding said workspace identifier in said QR code;
   c. presenting said workspace identifier to said application program to enable resumption of said workspace on said mobile computing device previously displayed on said desktop computer.

5. A method as recited in claim 4, further including the step of starting a timer upon displaying said QR code on said desktop computer and rejecting said authentication information presented to said application program if a preselected time allotment has expired.

6. A method for transferring session authentication information from a desktop computer to a mobile device, comprising the steps of:
   a. accumulating user authentication information on a desktop computer;
   b. generating a QR code encoding said authentication information;
   c. displaying said QR code as an image on a display associated with said desktop computer;
   d. capturing said QR code image on a mobile computing device;
   e. decoding said authentication information in said QR code image;
   f. directing a browser program running on said mobile computing device to ii access an application program the location of which is encoded in said QR image and passing said authentication information to said application program for secure access therefor;
   g. recording a session workspace identifier in an application displayed on said desktop computer;
   h. encoding said workspace identifier in said QR code; and,
   i. presenting said workspace identifier to said application program to enable resumption of said workspace on said mobile computing device previously displayed on said desktop computer.

7. A method as recited in claim 6, wherein said step of directing a browser program comprises the steps of launching a browser application on said mobile device, accessing a website at the url location encoded in the QR code image, and presenting authentication information to a remote server upon accessing said website.

8. A system for transferring session authentication from one computing device to another, comprising:
   a. a first computing device including means running on said first computing device for issuing a QR code responsive to an authentication transfer application, said first computing device including display means for displaying said QR code image;
   b. a second computing device including means running on said second computing device for decoding a QR code, said second computing device including display means for displaying images and optical capture means for making an electronic image recordation of said QR code image on said display means of said first computing device;
   c. a web application running on a computer server remotely located from said first and second computing devices;
   d. means running on said second computing device for decoding said QR code captured by said optical capture means;
   e. means running on said second computing device responsive to said decoding means for accessing an auto-authentication webpage on said computer server and for accessing a workspace previously saved on said computer server and previously viewed on said first computing device;
   f. means for creating a comma delimited character string including a universal resource locator, a date and time indicator, and a user ID and password;
   g. means for encrypting said comma delimited string with a salt of the current date; and,
   h. means for generating a QR image encoding said encrypted comma delimited string.

9. The system as recited in claim 8, wherein said QR decoding means on said second computing device further comprises, means for decoding said QR code image into a comma delimited string, means for decrypting said string with the current date as a salt, and means for saving said information into a memory array.

10. The system as recited in claim 9, further comprising:
    a. means for recording a session workspace identifier in an application displayed on said first computing device;
    b. means for encoding said workspace identifier in said QR code;
    c. wherein said accessing means further comprises means for presenting said workspace identifier to said remote server to enable resumption of said workspace on said mobile computing device previously displayed on said desktop computer.

11. The system as recited in claim 10, further including means for starting a timer upon displaying said QR code on said first computing device and rejecting said authentication information presented to said server if a preselected time allotment has expired.

12. A system for transferring session authentication from one computing device to another, comprising:
    a. a first computing device including means running on said first computing device for issuing a QR code responsive to an authentication transfer application, said first computing device including display means for displaying said QR code image;

b. a second computing device including means running on said second computing device for decoding a QR code, said second computing device including display means for displaying images and optical capture means for making an electronic image recordation of said QR code image on said display means of said first computing device;

c. a web application running on a computer server remotely located from said first and second computing devices;

d. means running on said second computing device for decoding said QR code captured by said optical capture means;

e. means running on said second computing device responsive to said decoding means for accessing an auto-authentication webpage on said computer server and for accessing a workspace previously saved on said computer server and previously viewed on said first computing device f. means for recording a session workspace identifier in an application displayed on said first computing device; and, g. means for encoding said workspace identifier in said QR code.

13. The system as recited in claim 12, wherein said accessing means comprises means for launching a browser application on said mobile device, means for accessing a website at the url location encoded in the QR code image, and means for presenting authentication information to a said computer server upon accessing said website.

14. A system for transferring session authentication information from a desktop computer to a mobile device, comprising:

a. means running on said desktop computer for generating a QR code on a desktop display, said QR code including login credentials associated with a user of said desktop computer;

b. means running on a mobile computing device for capturing said QR code displayed by said desktop computer;

c. means running on said mobile computing device for decoding said QR code;

d. means running on said mobile computing device responsive to said decoding means for accessing a website on a remote server, wherein said accessing means includes means for presenting login credentials decoded from said QR code to said remote server for authentication thereon;

e. means for creating a comma delimited character string including a universal resource locator, a date and time indicator, and a user ID and password;

f. means for encrypting said comma delimited string with a salt of the date recorded by said creating means; and, g. wherein said generating means encodes said encrypted comma delimited string.

15. The system as recited in claim 14, wherein said QR decoding means on said mobile computing device further comprises, means for decoding said QR code image into a comma delimited string, means for decrypting said string with the current date as a salt, and means for saving said information into a memory array.

16. A system for transferring session authentication information from a desktop computer to a mobile device, comprising:

a. means running on said desktop computer for generating a QR code on a desktop display, said QR code including login credentials associated with a user of said desktop computer;

b. means running on a mobile computing device for capturing said QR code displayed by said desktop computer;

c. means running on said mobile computing device for decoding said QR code;

d. means running on said mobile computing device responsive to said decoding means for accessing a website on a remote server, wherein said accessing means includes means for presenting login credentials decoded from said QR code to said remote server for authentication thereon;

e. means for recording a session workspace identifier in an application displayed on said desktop computer;

f. means for encoding said workspace identifier in said QR code; and, g. means for presenting said workspace identifier to said remote server to enable resumption of said workspace on said mobile computing device previously displayed on said desktop computer.

17. The system as recited in claim 16, wherein said accessing means further comprises means for accessing a website at a url location encoded in said QR code image, and means for presenting authentication information to said remote server upon accessing said website.

18. The system as recited in claim 17, wherein said capture means comprises a camera.

* * * * *